(12) United States Patent
Pardue et al.

(10) Patent No.: US 9,130,446 B2
(45) Date of Patent: Sep. 8, 2015

(54) EDDY CURRENT TORQUE TRANSFER COUPLING ASSEMBLY

(71) Applicants: Byron Andrew Pardue, Cookeville, TN (US); Edward Joseph Rossi, Scotts Valley, CA (US); Matthew Clayton Such, Neptune Beach, FL (US)

(72) Inventors: Byron Andrew Pardue, Cookeville, TN (US); Edward Joseph Rossi, Scotts Valley, CA (US); Matthew Clayton Such, Neptune Beach, FL (US)

(73) Assignee: Abd El & Larson Holdings, LLC, Fremont, CA (US)

( * ) Notice: Subject to any disclaimer, the term of this patent is extended or adjusted under 35 U.S.C. 154(b) by 479 days.

(21) Appl. No.: 13/687,234

(22) Filed: Nov. 28, 2012

(65) Prior Publication Data

US 2014/0145535 A1    May 29, 2014

(51) Int. Cl.
*H02K 49/04*    (2006.01)

(52) U.S. Cl.
CPC .............. *H02K 49/04* (2013.01); *H02K 49/043* (2013.01); *H02K 49/046* (2013.01)

(58) Field of Classification Search
CPC .... H02K 49/04; H02K 49/043; H02K 49/046
USPC .......................................... 310/105, 93, 75 R
See application file for complete search history.

(56) References Cited

U.S. PATENT DOCUMENTS

| | | | |
|---|---|---|---|
| 2,428,104 A | 9/1947 | Winther | |
| 2,465,982 A | 3/1949 | Winther et al. | |
| 2,701,315 A | 2/1955 | Winther et al. | |
| 2,971,105 A | 2/1961 | Jaeschke | |
| 3,566,168 A | 2/1971 | Matsubara et al. | |
| 3,573,518 A | 4/1971 | Liles | |
| 4,379,242 A | 4/1983 | MacDonald | |
| 4,683,392 A | 7/1987 | MacDonald et al. | |
| 4,937,483 A * | 6/1990 | Matsui et al. .................. | 310/105 |
| 5,054,587 A * | 10/1991 | Matsui et al. .................. | 188/267 |
| 5,337,862 A * | 8/1994 | Kuwahara ...................... | 188/158 |
| 5,491,370 A * | 2/1996 | Schneider et al. .............. | 310/54 |
| 6,900,569 B2 | 5/2005 | Stevenson et al. | |
| 6,948,597 B2 * | 9/2005 | Kuwahara ...................... | 188/164 |
| 2003/0030348 A1 * | 2/2003 | Lopatinsky et al. .......... | 310/254 |
| 2012/0024610 A1 * | 2/2012 | Woolmer ..................... | 180/65.51 |

* cited by examiner

*Primary Examiner* — Alex W Mok
(74) *Attorney, Agent, or Firm* — Ash Tankha; Lipton, Weinberger & Husick

(57) ABSTRACT

An electrical slip coupling assembly and method for enhancing transmission of torque are provided. The coupling assembly includes a field member (FM), an armature member (AM), and annular windings. The FM includes flux concentrating axial and radial teeth. The AM includes an interchangeable non-ferrous electrically conductive material cladding on an axial inner surface of the AM and a relatively low conductivity ferrous material cladding on a radial inner surface of the AM. The excitation of the annular windings induces the axial teeth and the radial teeth to generate flux field concentrations that create an axial eddy current zone (AECZ) in the AM across an axial air gap, and a radial eddy current zone (RECZ) in the AM across a radial air gap. During relative motion between the FM and the AM, the eddy currents in the AECZ and the RECZ create a driving torque between the FM and the AM.

22 Claims, 18 Drawing Sheets

| SLIP | AMP-TURNS | | | |
|---|---|---|---|---|
| SPEED | 3,250 | 6,500 | 9,750 | 13,000 |
| 250 | 2337 | 7896 | 11411 | 12570 |
| 500 | 2263 | 7572 | 11069 | 12382 |
| 750 | 2250 | 7219 | 10488 | 11808 |
| 1000 | 2263 | 6994 | 10002 | 11310 |
| 1250 | 2289 | 6876 | 9665 | 10937 |
| 1500 | 2304 | 6773 | 9401 | 10622 |
| 1750 | 2317 | 6709 | 9218 | 10399 |

FIG. 14

EDDY CURRENT TORQUE TRANSFER COUPLING ASSEMBLY

BACKGROUND

The transfer of torque between a first rotating device and a second rotating device that rotates at a different speed from that of the first rotating device, or between a rotating device and a stationary device is a common requirement in mechanical systems. The ability to transfer energy without physical contact between machine elements is necessary to avoid wear and tear of the machine elements caused due to tribological interactions between the machine elements. An example of an electrical machine that possesses the ability to transfer energy without physical contact between machine elements is an eddy current slip coupling system with an infinitely variable torque transmission. Typical eddy current slip coupling systems comprise relatively moving or slipping driving members and driven members composed of magnetic materials. One of the members may contain a thin plate of copper or a similarly conductive non-magnetic material facing. In these eddy current slip coupling systems, a field winding is used to generate a flux field that interlinks the driving member and the driven member. One of the members generates a concentrated flux, while the other member that receives the concentrated flux is an armature. The relative motion or slip between the driving member and the driven member produces movements of flux field concentrations in the armature. The slip and field excitation produces eddy currents in the armature, which in turn produces mechanically reactive flux, through which torque is transmitted between the driving member and the driven member.

Eddy current coupling systems have been available in different configurations for several years. In conventional systems, eddy currents are generated in either a radial design or an axial design. In such conventional systems, the armature receives the concentrated flux through an air gap in either a radial direction or an axial direction, which leads to a variation in torque transfer as the rotational speed changes. The retarder system manufactured by Valeo Corporation/Telma Retarder Inc., is an example of an axial system. The coupling systems manufactured by Dynamatic® of Omnidrive Holdings, LLC, utilize a radial eddy current system. Therefore, there is a need for an eddy current coupling assembly that generates eddy currents in both radial and axial directions for achieving uniform torque transfer characteristics over a range of rotational speeds.

The use of electrically conductive non-magnetic materials in eddy current coupling systems is currently available. However, although these materials increase the strength of the eddy currents generated, these materials also increase the magnetic reluctance of the magnetic circuit, which in turn requires more power to achieve the same flux levels. Moreover, higher differential speeds increase the frequency of the eddy currents that cause skin effects to limit the penetration of the eddy currents into the conductive material, resulting in a drop in torque transfer efficiency. As used herein, the term "skin effect" refers to a tendency of an alternating electric current to become distributed within a conductor such that the current density is largest near the surface of the conductor, and decreases with increasing depths within the conductor. The electric current flows mainly at the skin of the conductor, between the outer surface and a level called skin depth. Due to the manufacturing difficulties associated with applying layers of materials in a radial design, the layers of these materials are typically utilized in the axial designs. Therefore, there is a need for an eddy current coupling assembly that transfers high levels of torque across an entire slip speed range while keeping the coupling as compact as possible. A ratio between a rotation rate of a magnetic field as seen by a rotating member and a rotation rate of a magnetic field as seen by the other rotating member is referred to as the slip speed. Moreover, there is a need for reducing the variation of torque transfer as a function of slip speed, making torque transfer more uniform for a given field excitation throughout a range of slip speeds. Furthermore, there is a need for enhancing the torque transfer of the eddy current coupling assembly in different slip speed regions.

Hence, there is a long felt but unresolved need for an electrical slip coupling assembly that generates eddy currents in both radial and axial directions and that allows manipulation of torque transfer characteristics as a function of slip speed across a range of slip speeds for a given field excitation current using different configurations of a field member and an armature member of the electrical slip coupling assembly.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The electrical slip coupling assembly and method disclosed herein address the above stated needs for generating eddy currents in both radial and axial directions and for allowing manipulation of torque transfer characteristics as a function of slip speed across a range of slip speeds for a given field excitation current using different configurations of a field member and an armature member of the electrical slip coupling assembly. The electrical slip coupling assembly and method disclosed herein enhance the transmission of torque between rotating members, for example, the field member and the armature member, in different slip speed regions and reduce the variation of torque transfer as a function of slip speed, making torque transfer more uniform throughout the range of slip speeds for a given field excitation.

The electrical slip coupling assembly of the eddy current type disclosed herein comprises a field member, an armature member, and one or more annular windings. In an embodiment, the field member is a driving member and the armature member is a driven member. In another embodiment, the armature member is the driving member and the field member is the driven member. The field member is an annular component and comprises a disparate number of flux concentrating axial teeth and flux concentrating radial teeth. The flux concentrating axial teeth protrude axially from a body of the field member. The flux concentrating radial teeth protrude radially from the body of the field member. The armature member is concentrically disposed in relation to the field member. An axial air gap is defined between an axial inner surface of the armature member and the flux concentrating axial teeth of the field member. A radial air gap is defined between a radial inner surface of the armature member and the flux concentrating radial teeth of the field member.

The electrical slip coupling assembly disclosed herein further comprises an interchangeable non-ferrous electrically conductive material cladding disposed on the axial inner surface of the armature member, facing the flux concentrating axial teeth of the field member. A non-ferrous material refers to any material that does not contain iron, including alloys that do not contain iron in an appreciable amount, for example, an alloy that does not contain an amount of iron more than, for example, about 3% by weight of the alloy. The non-ferrous electrically conductive material cladding on the axial inner surface of the armature member is composed of an electrically conductive non-magnetic material with a relative permeability of about unity. The electrically conductive non-magnetic material is, for example, copper, aluminum, etc. The electrical slip coupling assembly disclosed herein further comprises a relatively low conductivity ferrous material cladding disposed on the radial inner surface of the armature member, facing the flux concentrating radial teeth of the field member. A ferrous material refers to any material, including alloys, that contains iron. As used herein, the term "relatively low conductivity ferrous material" refers to a magnetic material having a lower conductivity compared to the conductivity of a non-ferrous electrically conductive material. The relatively low conductivity ferrous material cladding on the radial inner surface of the armature member is composed of a magnetic material, for example, iron, steel, etc.

The annular windings are disposed around the field member. The annular windings disposed around the field member comprise, for example, a round cross section or a rectangular cross section with a predefined gauge and a predefined number of turns. The annular windings are disposed in multiple predefined positional configurations around the field member. For example, four annular windings are disposed around the field member. In another example, three annular windings are disposed around the field member. Excitation of the annular windings induces the flux concentrating axial teeth and the flux concentrating radial teeth of the field member to generate flux field concentrations across the axial air gap and the radial air gap respectively. The flux field concentrations create an axial eddy current zone in the armature member and a radial eddy current zone in the armature member. The axial eddy current zone faces the flux concentrating axial teeth across the axial air gap. The radial eddy current zone faces the flux concentrating radial teeth across the radial air gap. Excitation of the annular windings, for example, by an excitation current, and relative motion between the field member and the armature member generate high concentration eddy currents in the axial eddy current zone and the radial eddy current zone of the armature member. The high concentration eddy currents in the axial eddy current zone and the radial eddy current zone of the armature member produce reactive magnetic fields and thereby create a driving torque between the field member and the armature member. The interchangeable non-ferrous electrically conductive material cladding in the axial eddy current zone and the relatively low conductivity ferrous material cladding in the radial eddy current zone enable the enhanced variable transmission of the driving torque between the field member and the armature member over a range of slip speeds.

The interchangeable non-magnetic electrically conductive material cladding in the axial eddy current zone and the relatively low conductivity ferrous material cladding in the radial eddy current zone provides optimal transmission of torque between the field member and the armature member over a range of slip speeds. The non-ferrous electrically conductive material cladding on the axial inner surface of the armature member facing the flux concentrating axial teeth of the field member is configured to enhance generation of the eddy currents in the axial eddy current zone and to provide a stable torque developing performance at low slip speeds for a given field excitation in the annular windings. The relatively low conductivity ferrous material cladding on the radial inner surface of the armature member facing the flux concentrating radial teeth of the field member is configured to enhance generation of the eddy currents in the radial eddy current zone and to provide a stable torque developing performance at high slip speeds for a given field excitation in the annular windings. In an embodiment, the non-ferrous electrically conductive material cladding on the axial inner surface of the armature member and the relatively low conductivity ferrous material cladding on the radial inner surface of the armature member employ materials with different electrical properties and/or magnetic properties to achieve an optimal torque transmission profile over the range of slip speeds.

In an embodiment, one or more dimensional parameters and/or the number of the annular windings are varied for producing optimal torque transmission characteristics. In another embodiment, one or more dimensional parameters and/or the number of the flux concentrating axial teeth and the flux concentrating radial teeth are varied for producing optimal torque transmission characteristics.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 14 exemplarily illustrates a table listing torque transfer values (Newton-meters) of the electrical slip coupling assembly for a given range of slip speeds and field excitations (amp-turns) of the annular windings.

DETAILED DESCRIPTION OF THE INVENTION

Figure 1A:
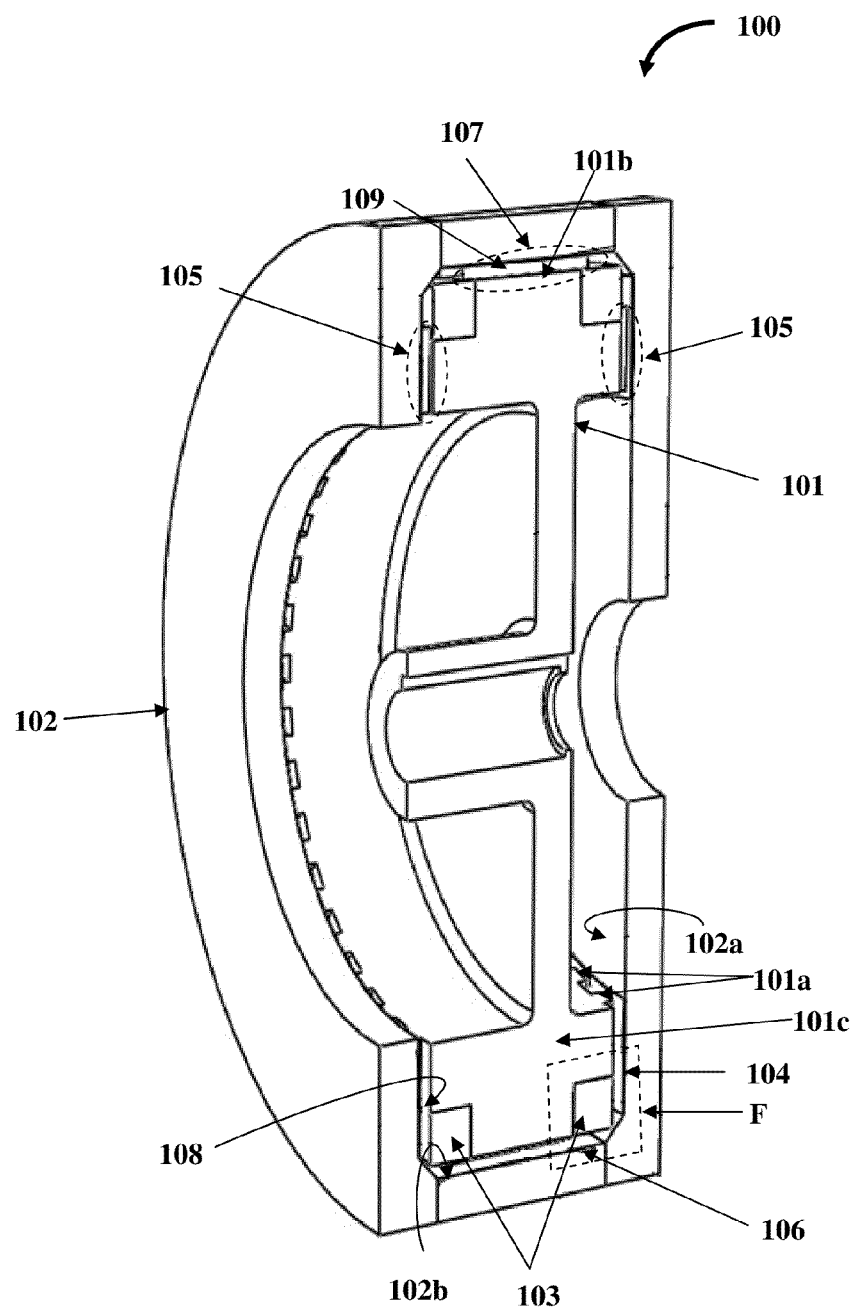
FIG. 1A exemplarily illustrates a cutaway perspective view of an electrical slip coupling assembly for enhancing variable transmission of torque between rotating members.
Figure 1B:
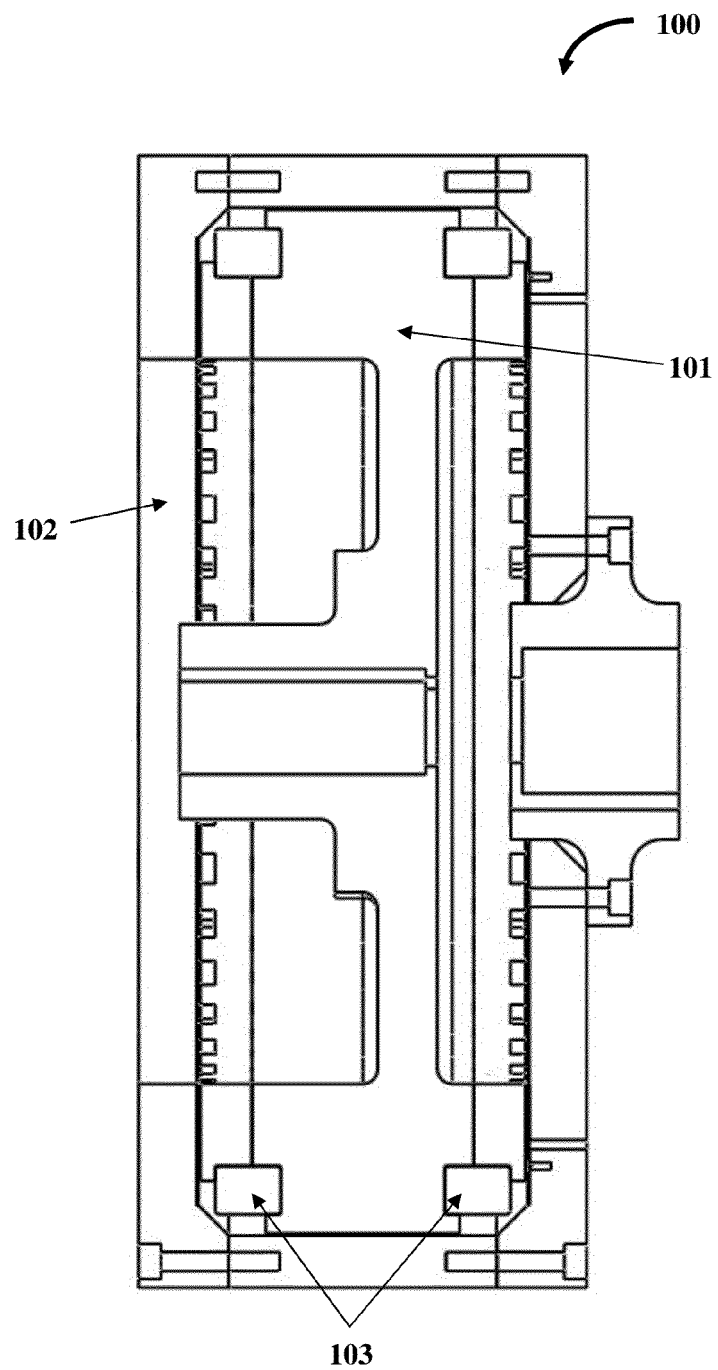
FIG. 1B exemplarily illustrates a cutaway elevation view of the electrical slip coupling assembly.

FIG. 1A and FIG. 1B exemplarily illustrate a cutaway perspective view and a cutaway elevation view respectively, of an electrical slip coupling assembly 100 for enhancing variable transmission of torque between one or more rotating members, that is, a field member 101 and an armature member 102. The electrical slip coupling assembly 100 disclosed herein comprises the field member 101, the armature member 102, and one or more annular windings 103. The field member 101 is an annular component and comprises a disparate number of flux concentrating axial teeth 101a and flux concentrating radial teeth 101b. The flux concentrating axial teeth 101a protrude axially from a body 101c of the field member 101. The flux concentrating radial teeth 101b protrude radially from the body 101c of the field member 101. The armature member 102 is concentrically disposed in relation to the field member 101. An axial air gap 108 is defined between an axial inner surface 102a of the armature member 102 and the flux concentrating axial teeth 101a of the field member 101. A radial air gap 109 is defined between a radial inner surface 102b of the armature member 102 and the flux concentrating radial teeth 101b of the field member 101.

The electrical slip coupling assembly 100 further comprises an interchangeable non-ferrous electrically conductive material cladding 104 disposed on the axial inner surface 102a of the armature member 102, facing the flux concentrating axial teeth 101a of the field member 101. A non-ferrous material refers to any material that does not contain iron, including alloys that do not contain iron in an appreciable amount, for example, an alloy that does not contain an amount of iron more than, for example, about 3% by weight of the alloy. The electrical slip coupling assembly 100 further comprises a relatively low conductivity ferrous material cladding 106 disposed on the radial inner surface 102b of the armature member 102, facing the flux concentrating radial teeth 101b of the field member 101. A ferrous material refers to any material, including alloys, that contains iron. As used herein, the term "relatively low conductivity ferrous material" refers to a magnetic material having a lower conductivity compared to the conductivity of a non-ferrous electrically conductive material. For example, the conductivity of the relatively low conductivity ferrous material that constitutes the radial cladding 106 ranges from about 0.5e6 Siemens per meter (S/m) to about 9.99e6 S/m. The permeability of the relatively low conductivity ferrous material that constitutes the radial cladding 106 ranges from about 8.75e-4 henries per meter (H/m) to about 5.0e-3 H/m. The conductivity of the non-ferrous electrically conductive material that constitutes the axial cladding 104 ranges, for example, from about 1.0e7 S/m to about 6.5e7 S/m. The permeability of the non-ferrous electrically conductive material that constitutes the axial cladding 104 is of a relative permeability of, for example, about 1 H/m or about 1.256e-6 H/m.

The annular windings 103 are disposed around the field member 101. Excitation of the annular windings 103 induces the flux concentrating axial teeth 101a and the flux concentrating radial teeth 101b of the field member 101 to generate flux field concentrations across the axial air gap 108 and the radial air gap 109 respectively. The flux field concentrations are present across the axial air gap 108 and the radial air gap 109 with or without relative motion between the field member 101 and the armature member 102. The flux field concentrations create an axial eddy current zone 105 in the armature member 102 and a radial eddy current zone 107 in the armature member 102. The axial eddy current zone 105 faces the flux concentrating axial teeth 101a across the axial air gap 108. The radial eddy current zone 107 faces the flux concentrating radial teeth 101b across the radial air gap 109.

Excitation of the annular windings 103, for example, by an excitation current, and relative motion between the field member 101 and the armature member 102 generate high concentration eddy currents in the axial eddy current zone 105 and the radial eddy current zone 107 of the armature member 102. The high concentration eddy currents in the axial eddy current zone 105 and the radial eddy current zone 107 of the armature member 102 produce reactive magnetic fields and thereby create a driving torque between the field member 101 and the armature member 102. The interchangeable non-ferrous electrically conductive material cladding 104 in the axial eddy current zone 105 and the relatively low conductivity ferrous material cladding 106 in the radial eddy current zone 107 enable enhanced variable transmission of the driving torque between the field member 101 and the armature member 102 over a range of slip speeds. The electrical slip coupling assembly 100 couples the field member 101 and the armature member 102 moving at different speeds to transfer the torque from the field member 101 to the armature member 102 without physical contact between the field member 101 and the armature member 102.

In an embodiment, the field member 101 is the driving member and the armature member 102 is the driven member. In another embodiment, the armature member 102 is the driving member and the field member 101 is the driven member, where the field member 101 creates a magnetic field or magnetic flux for the armature member 102 to interact with, and hence the field member 101 comprises either permanent magnets or electromagnets formed by a conducting coil. A driving member is, for example, an input rotor connected to a fixed speed motor, and separated by a small air gap from the driven member. The input rotor, for example, 101 or 102 transmits torque to an output rotor, for example, 102 or 101 based on the field excitation in the input rotor, for example, 101 or 102. The driven member is an adjustable speed output rotor, for example, 101 or 102 that is connected to a load for mechanically transmitting the torque to the load. Interchanging the function of the field member 101 and the armature member 102 to operate as either a driving member or a driven member does not alter the operational principles of the electrical slip coupling assembly 100 disclosed herein. Similarly, interchanging the non-ferrous electrically conductive material cladding 104 on the axial inner surface 102a of the armature member 102 and the relatively low conductivity ferrous material cladding 106 on the radial inner surface 102b of the armature member 102 with each other does not alter the operational principles of the electrical slip coupling assembly 100 disclosed herein.

In operation, the armature member 102 and the field member 101 rotate in one direction. The annular windings 103 are magnetized by applying a predetermined current through the annular windings 103, which results in the formation of a magnetic flux field F exemplarily illustrated in FIG. 1A. The magnetic flux field F passes through the pole-forming flux concentrating axial teeth 101a, the axial air gap 108, the armature member 102, the radial air gap 109, the pole-forming flux concentrating radial teeth 101b, and the field member 101 sequentially. The distribution of the magnetic flux in the axial air gap 108 and the radial air gap 109 is concentrated at intervals by the pole-forming flux concentrating teeth 101a and 101b respectively. Upon relative rotation or slip of the armature member 102 and the field member 101, an arching movement of the flux field concentrations creates the high concentration axial eddy current zone 105 and the high concentration radial eddy current zone 107. The eddy currents in the axial eddy current zone 105 and the radial eddy current zone 107 produce reactive magnetic fields counter to the fields in the pole-forming flux concentrating axial teeth 101a and flux concentrating radial teeth 101b respectively, to create a driving torque between the field member 101 and the armature member 102.

Figure 2A:
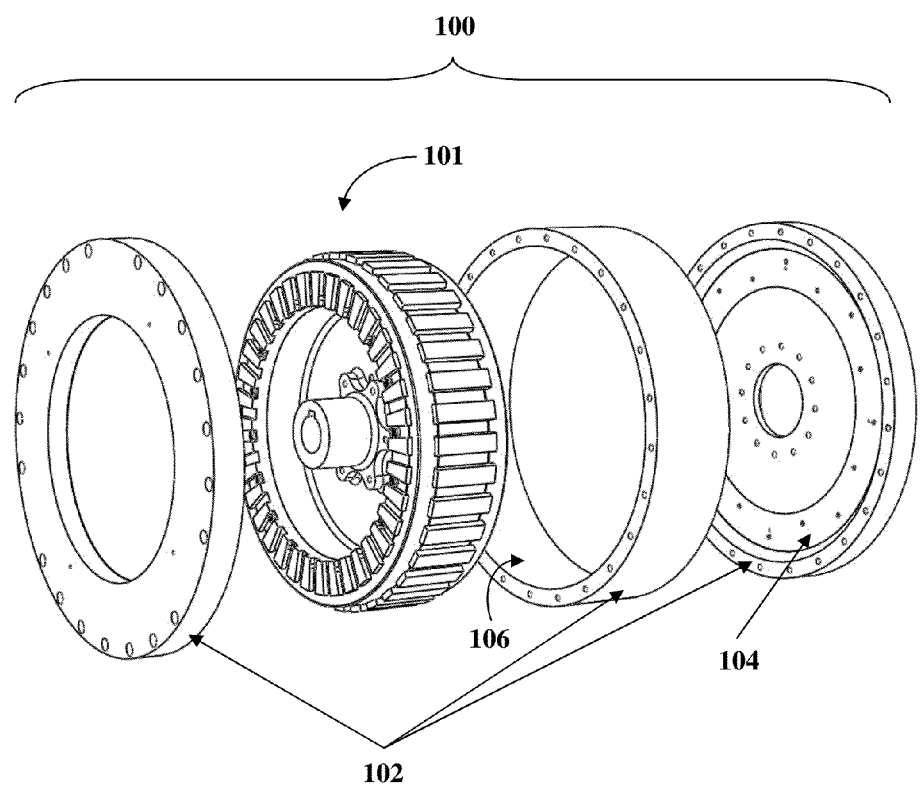
FIG. 2A exemplarily illustrates a perspective exploded view of the electrical slip coupling assembly.
Figure 2B:
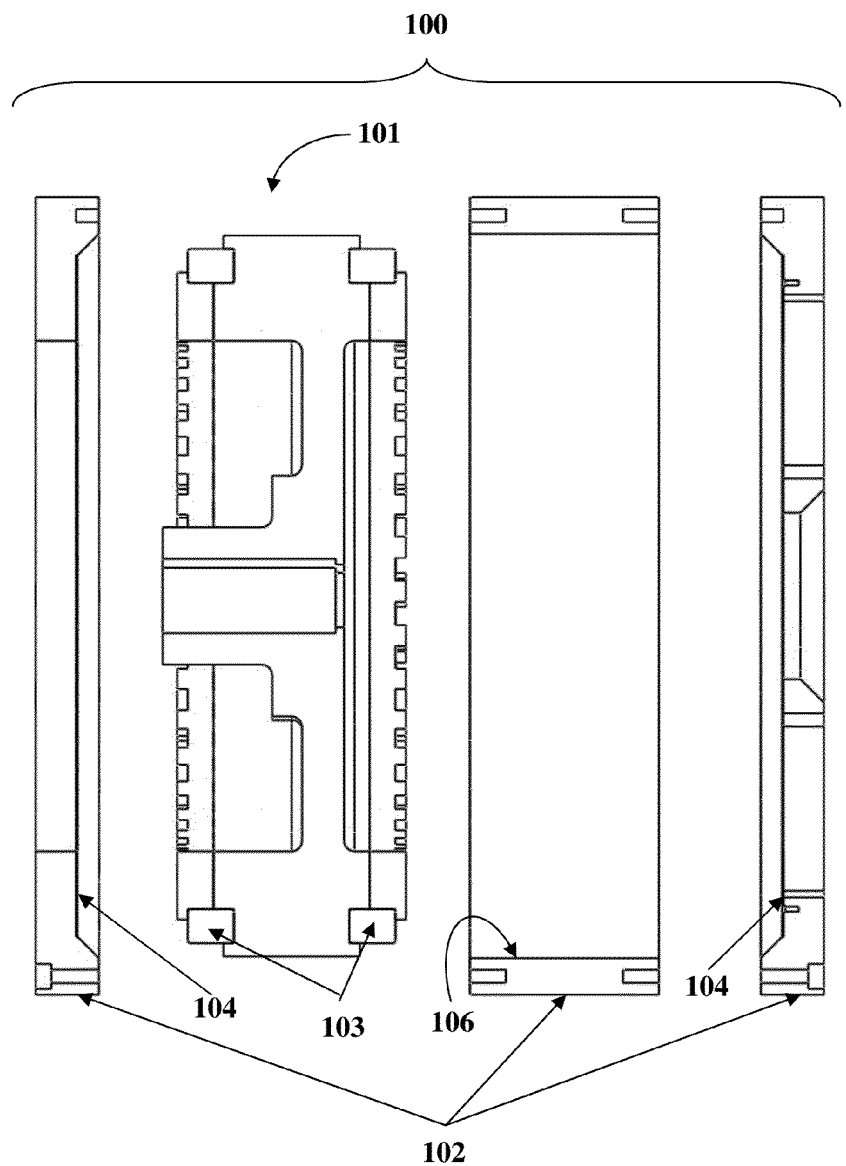
FIG. 2B exemplarily illustrates an exploded elevation view of the electrical slip coupling assembly.

FIGS. 2A-2B exemplarily illustrate exploded views of the electrical slip coupling assembly 100. A perspective exploded view of the electrical slip coupling assembly 100 is exemplarily illustrated in FIG. 2A. An exploded elevation view of the electrical slip coupling assembly 100 is exemplarily illustrated in FIG. 2B. FIGS. 2A-2B show the field member 101, the armature member 102, and the annular windings 103 disclosed in the detailed description of FIGS. 1A-1B. FIGS. 2A-2B also show the non-ferrous electrically conductive material cladding 104 and the relatively low conductivity ferrous material cladding 106 of the armature member 102.

Figure 3:
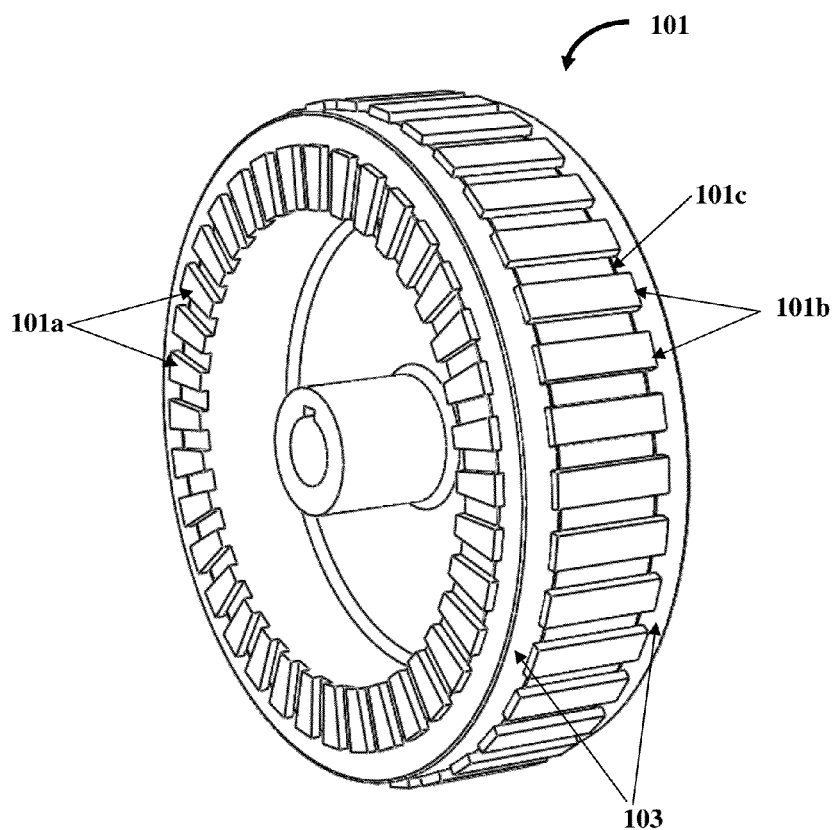
FIG. 3 exemplarily illustrates a perspective view of a field member of the electrical slip coupling assembly.

FIG. 3 exemplarily illustrates a perspective view of the field member 101 of the electrical slip coupling assembly 100. The field member 101 comprises a disparate number of flux concentrating axial teeth 101a protruding axially from the body 101c of the field member 101, and flux concentrating protruding radial teeth 101b protruding radially from the body 101c of the field member 101 as disclosed in the detailed description of FIGS. 1A-1B. The annular windings 103 are disposed around the field member 101.

Figure 4:
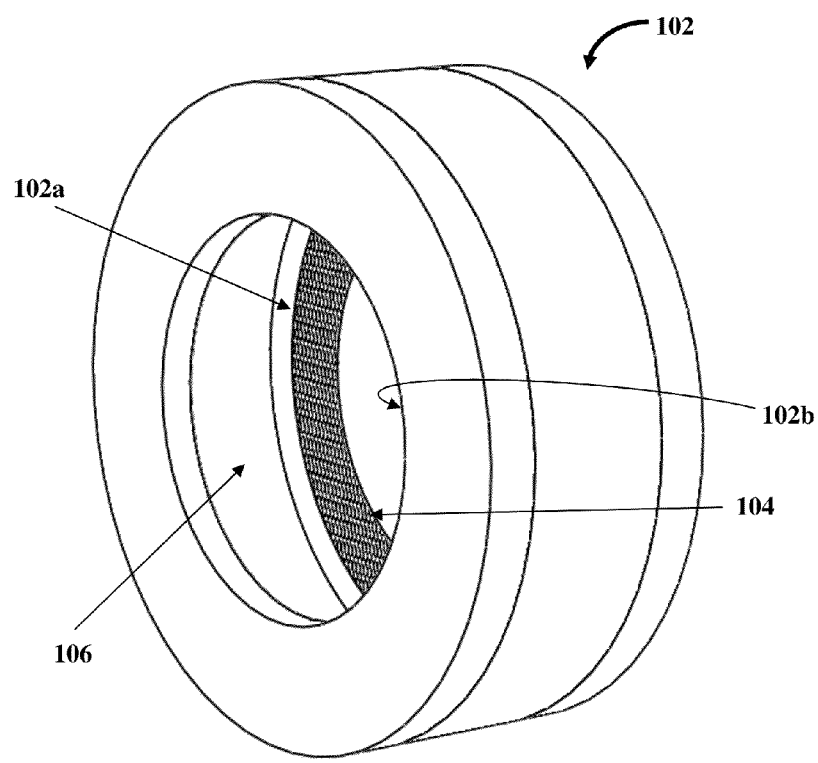
FIG. 4 exemplarily illustrates a perspective view of an armature member of the electrical slip coupling assembly.

FIG. 4 exemplarily illustrates a perspective view of the armature member 102 of the electrical slip coupling assembly 100. The armature member 102 comprises an interchangeable non-ferrous electrically conductive material cladding 104 on the axial inner surface 102a of the armature member 102 and a relatively low conductivity ferrous material cladding 106 on the radial inner surface 102b of the armature member 102 as disclosed in the detailed description of FIGS. 1A-1B. The axial inner surface 102a of the armature member 102 is clad or inlaid with the non-ferrous electrically conductive material cladding 104. The non-ferrous electrically conductive material cladding 104 is in direct conductive contact with the axial inner surface 102a of the armature member 102 to form a conductive material facing of a predefined thickness. The non-ferrous electrically conductive material cladding 104 on the axial inner surface 102a of the armature member 102 faces the flux concentrating axial teeth 101a of the field member 101 across the axial air gap 108 as exemplarily illustrated in FIG. 1A. The radial inner surface 102b of the armature member 102 is clad or inlaid with the relatively low conductivity ferrous material cladding 106. The relatively low conductivity ferrous material cladding 106 is in direct contact with the radial inner surface 102b of the armature member 102 to form a low conductivity material facing of a predefined thickness. The relatively low conductivity ferrous material cladding 106 on the radial inner surface 102b of the ferromagnetic armature member 102 faces the flux concentrating radial teeth 101b of the field member 101 across the radial air gap 109 as exemplarily illustrated in FIG. 1A.

The non-ferrous electrically conductive material cladding 104 on the axial inner surface 102a of the armature member 102 facing the flux concentrating axial teeth 101a of the field member 101 is configured to enhance generation of eddy currents in the axial eddy current zone 105 exemplarily illustrated in FIG. 1A, and to provide stable torque developing performance at low slip speeds for a given field excitation of the annular windings 103. The relatively low conductivity ferrous material cladding 106 on the radial inner surface 102b of the armature member 102 facing the flux concentrating radial teeth 101b of the field member 101 is configured to enhance generation of eddy currents in the radial eddy current zone 107 exemplarily illustrated in FIG. 1A, and to provide a stable torque developing performance at high slip speeds for a given field excitation in the annular windings 103.

In an embodiment, the non-ferrous electrically conductive material cladding 104 on the axial inner surface 102a of the armature member 102 and the relatively low conductivity ferrous material cladding 106 on the radial inner surface 102b of the armature member 102 employ materials with different electrical properties and/or magnetic properties to achieve an optimal torque transmission profile over a range of slip speeds. For example, the non-ferrous electrically conductive material cladding 104 on the axial inner surface 102a of the armature member 102 is composed of an electrically conductive non-magnetic material with a relative permeability of about unity. The electrically conductive non-magnetic material is, for example, copper, aluminum, etc. The relatively low conductivity ferrous material cladding 106 on the radial inner surface 102b of the armature member 102 is composed of a magnetic material, for example, iron, steel, etc.

Figure 5:
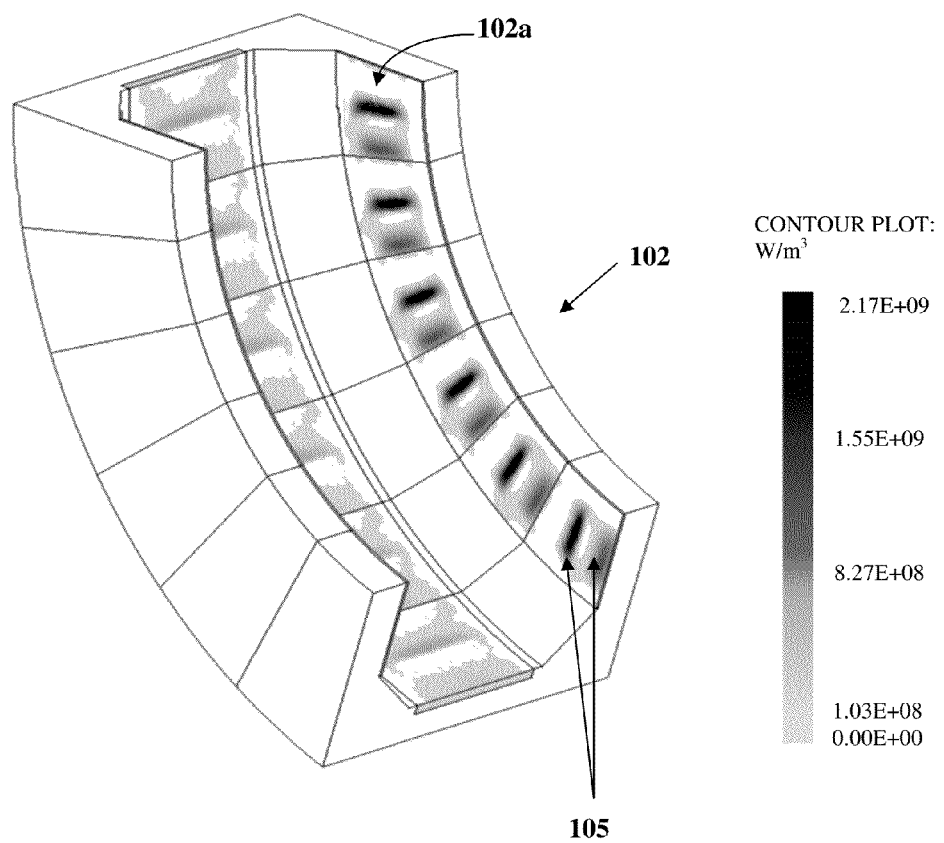
FIG. 5 exemplarily illustrates a Joule loss density plot for low slip speed ranges of the electrical slip coupling assembly.

FIG. 5 exemplarily illustrates a Joule loss density plot for low slip speed ranges of the electrical slip coupling assembly 100 exemplarily illustrated in FIGS. 1A-1B and FIGS. 2A-2B. By employing a non-ferrous electrically conductive material cladding 104 or facing of a specified thickness on the axial inner surface 102a of the armature member 102, the concentration of eddy currents in the armature member 102 at low slip speeds can be increased. As exemplarily illustrated in FIG. 5, the copper electrically conductive material cladding 104 on the axial inner surface 102a of the armature member 102 dominates in terms of providing high concentrations of eddy current and hence torque. FIG. 5 also illustrates the axial eddy current zones 105 that are active at low slip speeds.

Figure 6:
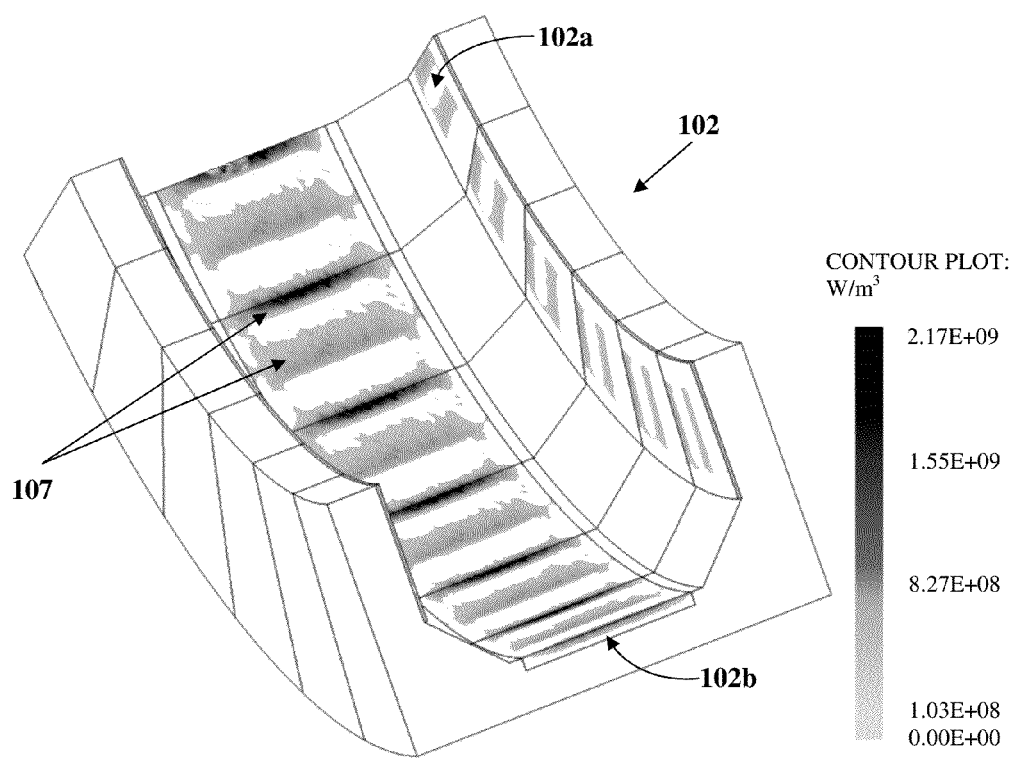
FIG. 6 exemplarily illustrates a Joule loss density plot for high slip speed ranges of the electrical slip coupling assembly.

FIG. 6 exemplarily illustrates a Joule loss density plot for high slip speed ranges of the electrical slip coupling assembly 100 exemplarily illustrated in FIGS. 1A-1B and FIGS. 2A-2B. FIG. 6 also illustrates the radial eddy current zones 107 that are active at high slip speeds. At higher slip speeds, the steel relatively low conductivity material cladding 106 on the radial inner surface 102b of the armature member 102 dominates in terms of providing high concentrations of eddy current and hence torque, as exemplarily illustrated in FIG. 6.

Figure 7:
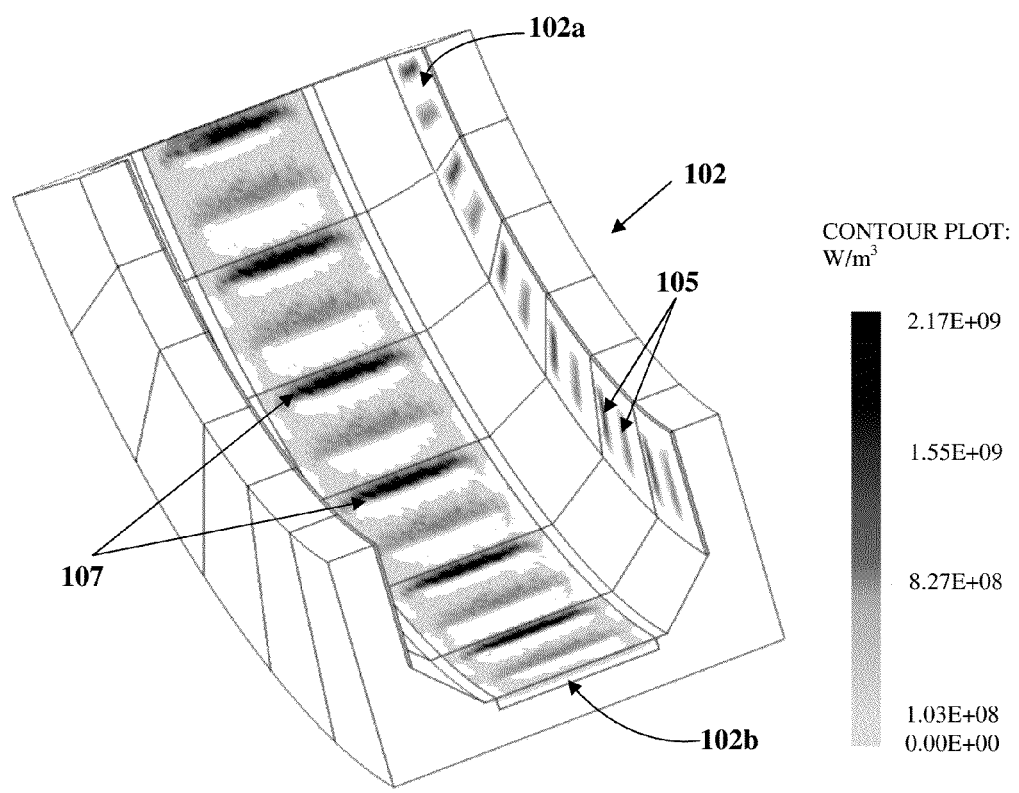
FIG. 7 exemplarily illustrates a Joule loss density plot for middle slip speed ranges of the electrical slip coupling assembly.

FIG. 7 exemplarily illustrates a Joule loss density plot for middle slip speed ranges of the electrical slip coupling assembly 100 exemplarily illustrated in FIGS. 1A-1B and FIGS. 2A-2B. FIG. 7 also illustrates both the axial eddy current zones 105 and the radial eddy current zones 107 that are active at a middle range of slip speeds. In the middle range of slip speeds, both the axial eddy current zones 105 and the radial eddy current zones 107 provide comparable amounts of torque as exemplarily illustrated in FIG. 7.

The armature member 102 comprises a non-ferrous electrically conductive material, for example, copper on the axial inner surface 102a of the armature member 102 and a relatively low conductivity ferrous material, for example, steel on the radial inner surface 102b of the armature member 102, which causes the torque curve exemplarily illustrated in FIGS. 5-7 to be more constant across the slip speed range.

Figure 8:
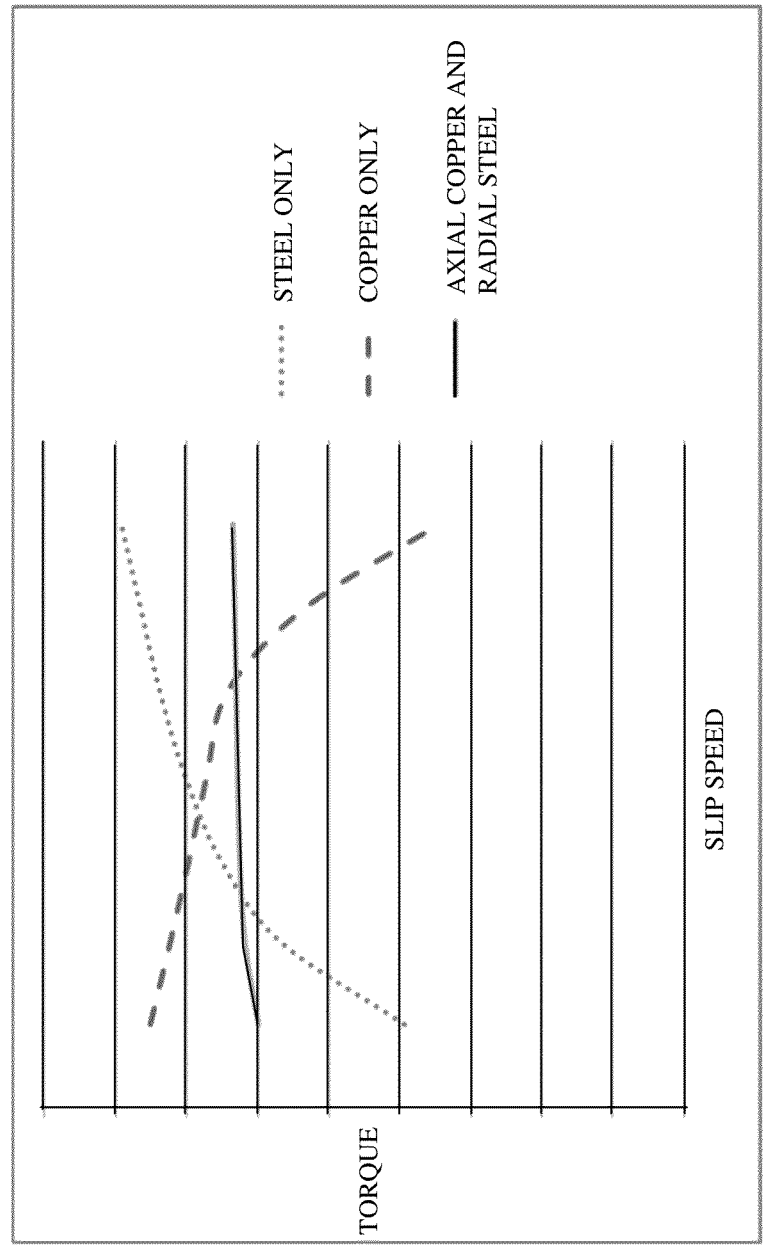
FIG. 8 exemplarily illustrates a graph showing a variation of torque with respect to slip speed for a given field excitation.

FIG. 8 exemplarily illustrates a graph showing a variation of torque with respect to slip speed for a given field excitation. The use of disparate materials in the axial eddy current zone 105 and the radial eddy current zone 107 exemplarily illustrated in FIG. 1A, allows a coupling designer to shape the torque versus slip speed curve to meet the desired performance requirement for any given application. The torque versus speed curve can also be manipulated by varying the thickness of the non-ferrous electrically conductive material cladding 104 on the axial inner surface 102a of the armature member 102 and the relatively low conductivity ferrous material cladding 106 on the radial inner surface 102b of the armature member 102. Although a non-ferrous electrically conductive material, for example, copper provides an optimal torque developing performance at low slip speeds, the torque quickly drops off at high slip speeds due to skin effects. A relatively low conductivity ferrous material, for example, steel provides optimal torque developing performance at high slip speeds. The electrical slip coupling assembly 100 exemplarily illustrated in FIGS. 1A-1B and FIGS. 2A-2B, provides good performance over the entire speed differential range with the use of both copper and steel in the electrical slip coupling assembly 100 as exemplarily illustrated in FIG. 8.

Figure 9:
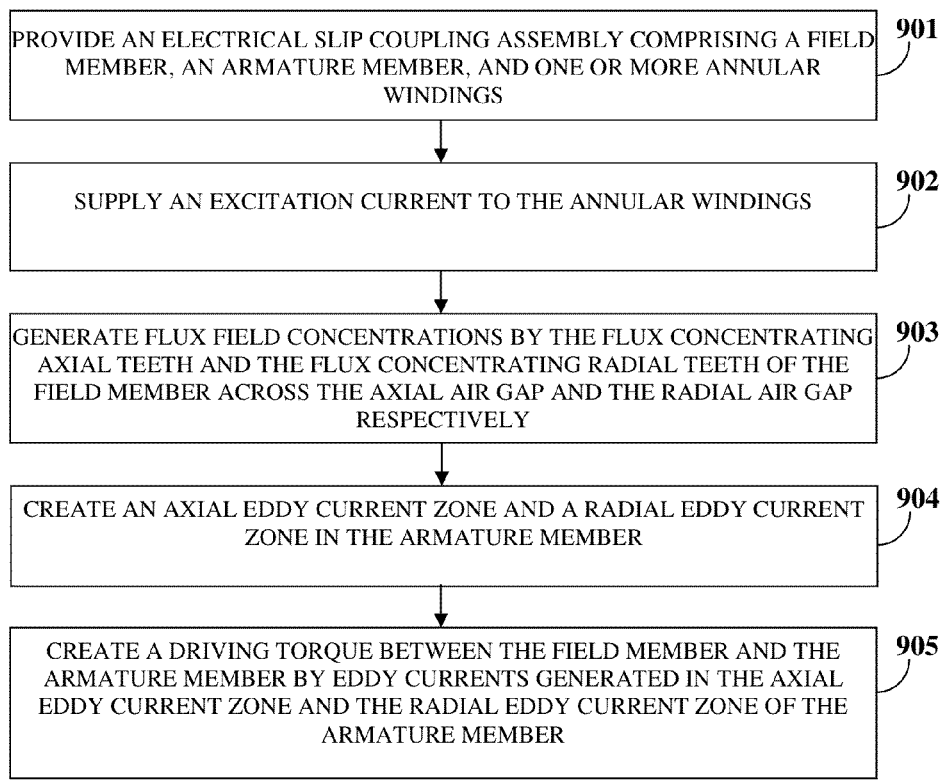
FIG. 9 illustrates a method for enhancing variable transmission of torque between rotating members.

FIG. 9 illustrates a method for enhancing variable transmission of torque between rotating members, for example, 101 and 102 exemplarily illustrated in FIGS. 1A-1B and FIGS. 2A-2B. An electrical slip coupling assembly 100 comprising a field member 101, an armature member 102 concentrically disposed in relation to the field member 101, and one or more annular windings 103 disposed around the field member 101, as disclosed in the detailed description of FIGS. 1A-1B, is provided 901. An excitation current is supplied 902 to the annular windings 103 for inducing the flux concentrating axial teeth 101a and the flux concentrating radial teeth 101b of the field member 101 to generate 903 flux field concentrations across the axial air gap 108 and the radial air gap 109 respectively. The flux field concentrations create 904 an axial eddy current zone 105 and a radial eddy current zone 107 in the armature member 102. The axial eddy current zone 105 faces the flux concentrating axial teeth 101a across the axial air gap 108. The radial eddy current zone 107 faces the flux concentrating radial teeth 101b across the radial air gap 109. Excitation of the annular windings 103, for example, by an excitation current, and relative motion between the field member 101 and the armature member 102 generate high concentration eddy currents in the axial eddy current zone 105 and the radial eddy current zone 107 of the armature member 102. The high concentration eddy currents in the axial eddy current zone 105 and the radial eddy current zone 107 of the armature member 102 produce reactive magnetic fields and thereby create 905 a driving torque between the field member 101 and the armature member 102. The interchangeable non-ferrous electrically conductive material cladding 104 in the axial eddy current zone 105 and the relatively low conductivity ferrous material cladding 106 in the radial eddy current zone 107 provide optimal transmission of the driving torque between the field member 101 and the armature member 102 over a range of slip speeds. Materials with different electrical properties and/or magnetic properties are selected for the non-ferrous electrically conductive material cladding 104 on the axial inner surface 102a of the armature member 102 and the relatively low conductivity ferrous material cladding 106 on the radial inner surface 102b of the armature member 102 to achieve an optimal torque transmission profile over the range of slip speeds.

Figure 10A:
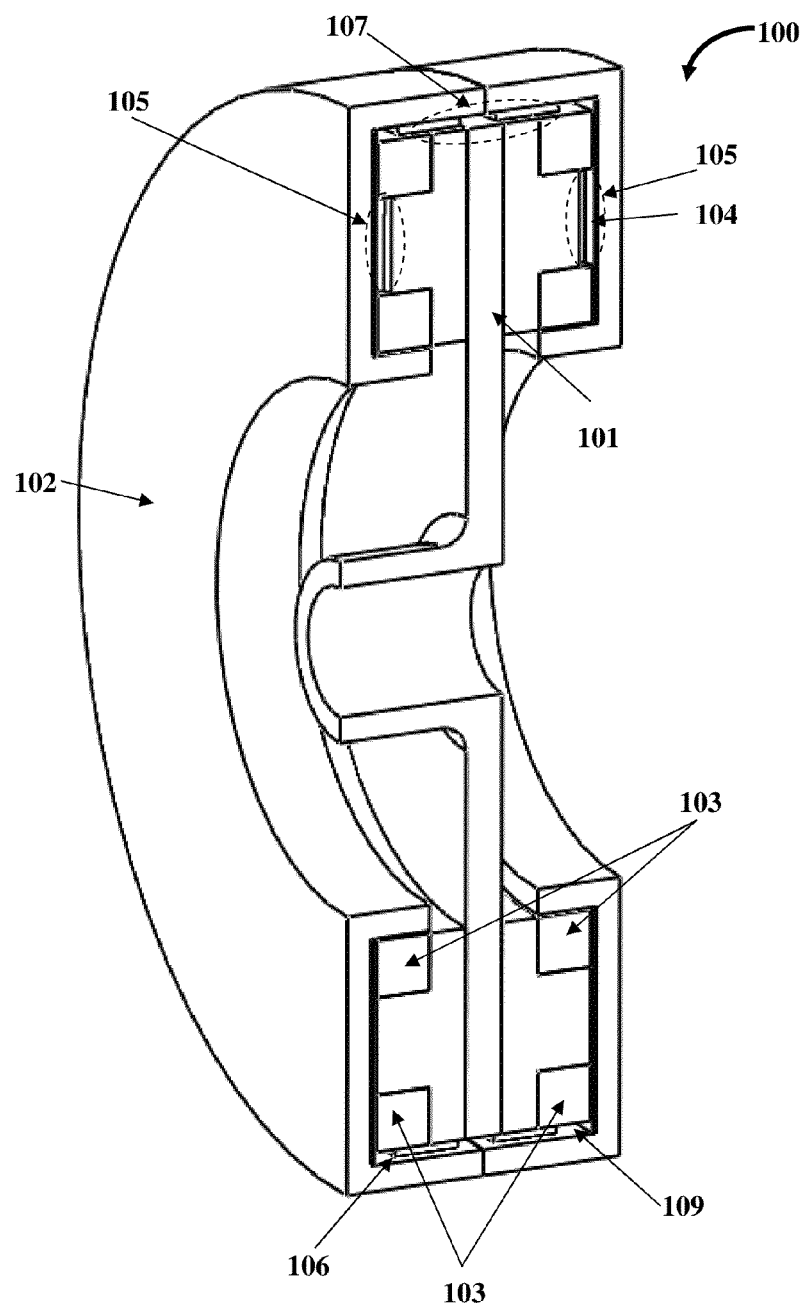
FIG. 10A exemplarily illustrates a cutaway perspective view of the electrical slip coupling assembly, showing an embodiment of the field member having four annular windings.
Figure 10B:
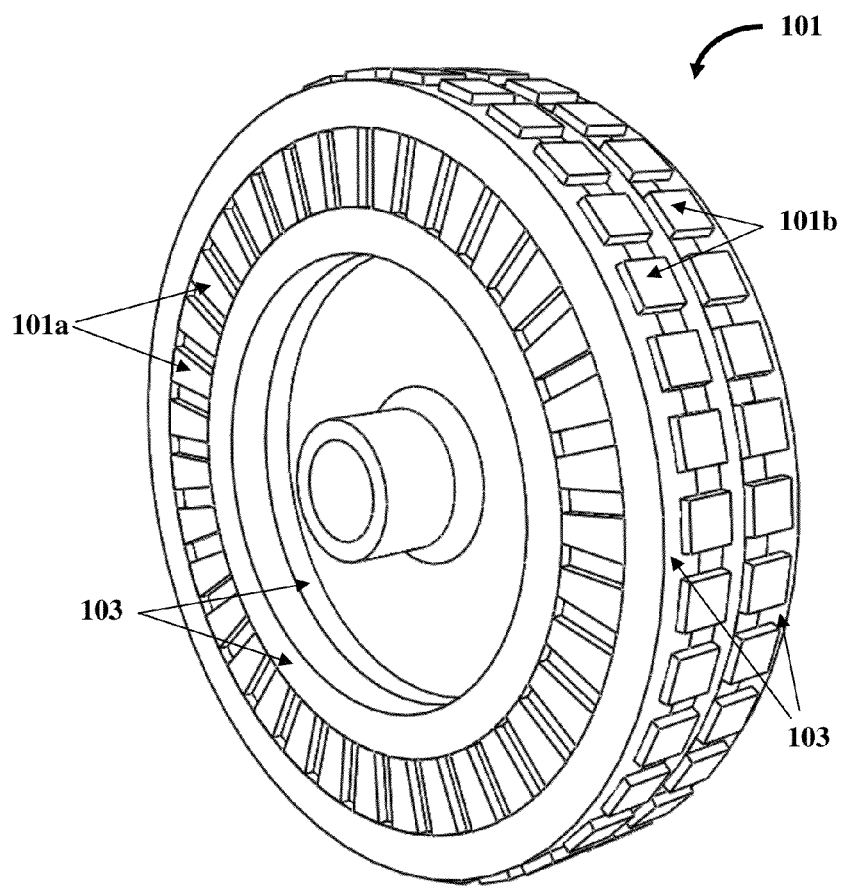
FIG. 10B exemplarily illustrates a perspective view of the embodiment of the field member having four annular windings.

FIGS. 10A-10C exemplarily illustrate perspective views of the electrical slip coupling assembly 100, showing embodiments of the field member 101 having a different number of annular windings 103. As disclosed in the detailed description of FIGS. 1A-1B, the electrical slip coupling assembly 100 comprises a field member 101, an armature member 102, and one or more annular windings 103 disposed around the field member 101. In an embodiment, the annular windings 103 disposed around the field member 101 have, for example, a round cross section or a rectangular cross section with a predefined gauge and a predefined number of turns. The annular windings 103 are disposed in multiple predefined positional configurations around the field member 101. In an example, four annular windings 103 are disposed around the field member 101. FIG. 10A exemplarily illustrates a cutaway perspective view of the electrical slip coupling assembly 100, showing the embodiment of the field member 101 having four annular windings 103. A perspective view of an embodiment of the field member 101 of the electrical slip coupling assembly 100 having four annular windings 103 is exemplarily illustrated in FIG. 10B. In another example, three annular windings 103 are disposed around the field member 101.

Figure 11:
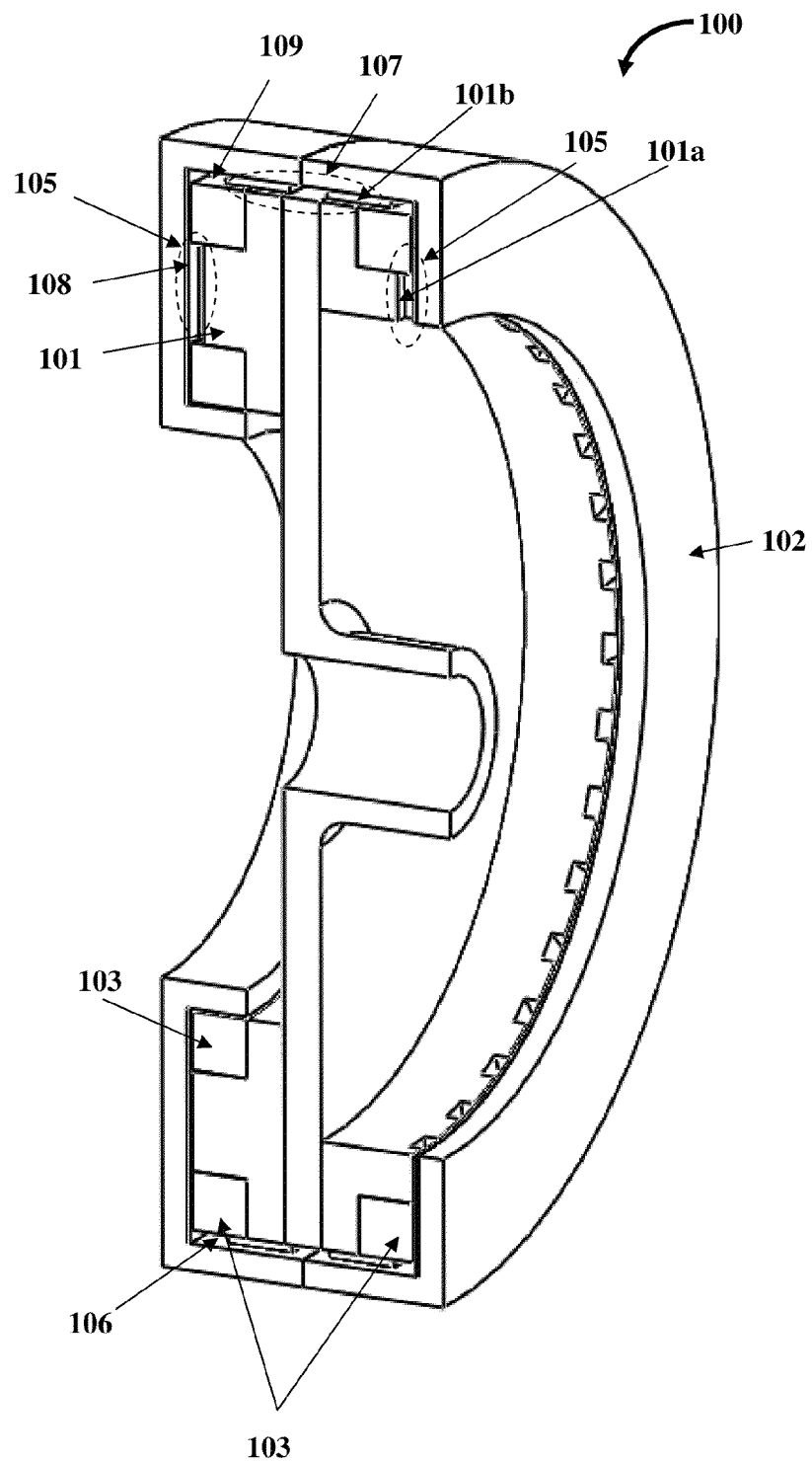
FIG. 11 exemplarily illustrates a cutaway perspective view of the electrical slip coupling assembly, showing another embodiment of the field member having three annular windings.

FIG. 11 exemplarily illustrates a cutaway perspective view of the electrical slip coupling assembly 100, showing another embodiment of the field member 101 having three annular windings 103. As disclosed in the detailed description of FIGS. 1A-1B, the electrical slip coupling assembly 100 comprises a field member 101, an armature member 102, and one or more annular windings 103 disposed around the field member 101.

Figure 12:
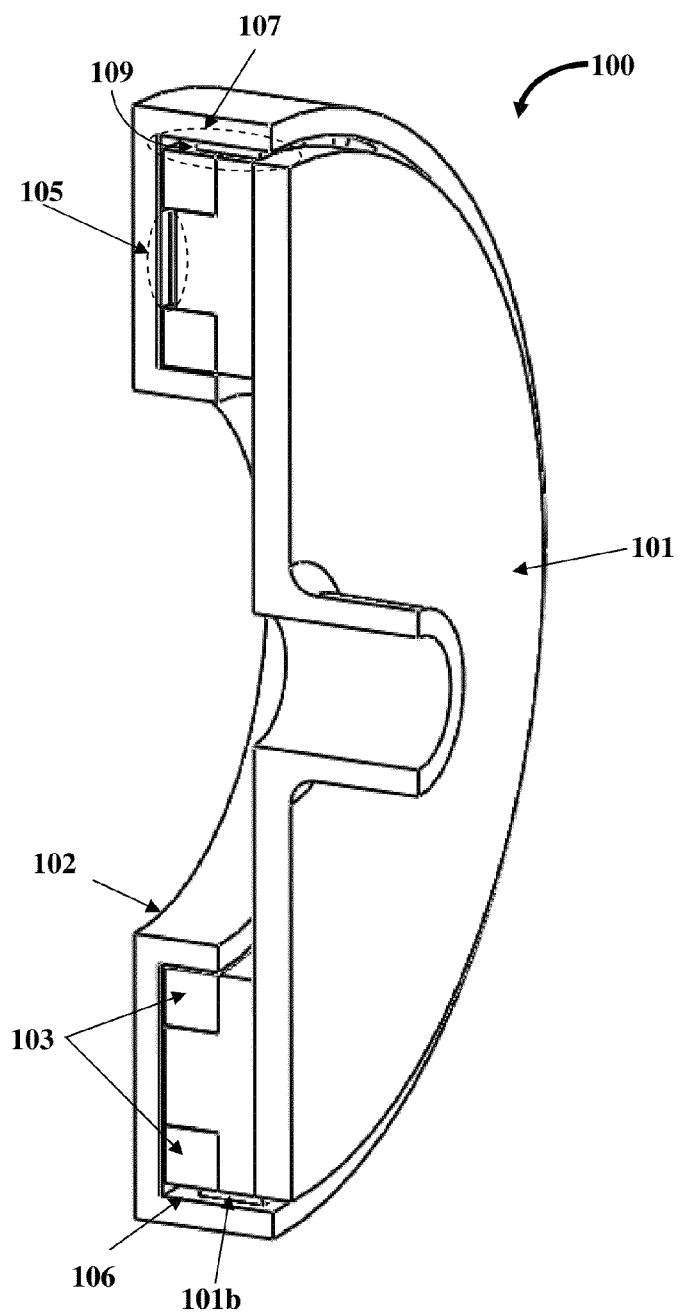
FIG. 12 exemplarily illustrates a cutaway perspective view of the electrical slip coupling assembly, showing another embodiment of the field member having two annular windings.

FIG. 12 exemplarily illustrates a cutaway perspective view of the electrical slip coupling assembly 100, showing another embodiment of the field member 101 having two annular windings 103 in a U-shaped configuration. As exemplarily illustrated in FIG. 12, two annular windings 103 are disposed on a single side of the electrical slip coupling assembly 100 forming a U-shaped configuration. The variation in the number of annular windings 103, as disclosed in the detailed description of FIGS. 10A-10B and FIGS. 11-12, offers several options for the mechanical configurations of the electrical slip coupling assembly 100 in order to obtain the required torque characteristics. The U-shaped configuration of FIG. 12 offers alignment and assembly benefits over the other embodiments exemplarily illustrated in FIGS. 10A-10B and FIG. 11. The configurations in FIGS. 10A-10B and FIG. 11 allow torque generation to be maximized with the same physical size as that of the electrical slip coupling assembly 100 exemplarily illustrated in FIGS. 1A-1B and FIGS. 2A-2B.

In an embodiment, the dimensional parameters and/or the number of the annular windings 103 can be varied to produce optimal torque transmission characteristics of the electrical slip coupling assembly 100. In another embodiment, the dimensional parameters and/or the number of the flux concentrating axial teeth 101a and the flux concentrating radial teeth 101b can be varied to produce optimal torque transmission characteristics. The torque increases as the diameter of the annular windings 103 is increased due to the magnetic forces generated at a larger radius. The surface area of the flux concentrating axial teeth 101a and the flux concentrating radial teeth 101b, directly across from the axial eddy current zone 105 and the radial eddy current zone 107 respectively, need to be roughly equivalent in order for the magnetic flux to flow evenly. Moreover, care has to be taken while configuring the size of the flux concentrating axial teeth 101a and the flux concentrating radial teeth 101b to avoid saturation of that material.

Figure 13:
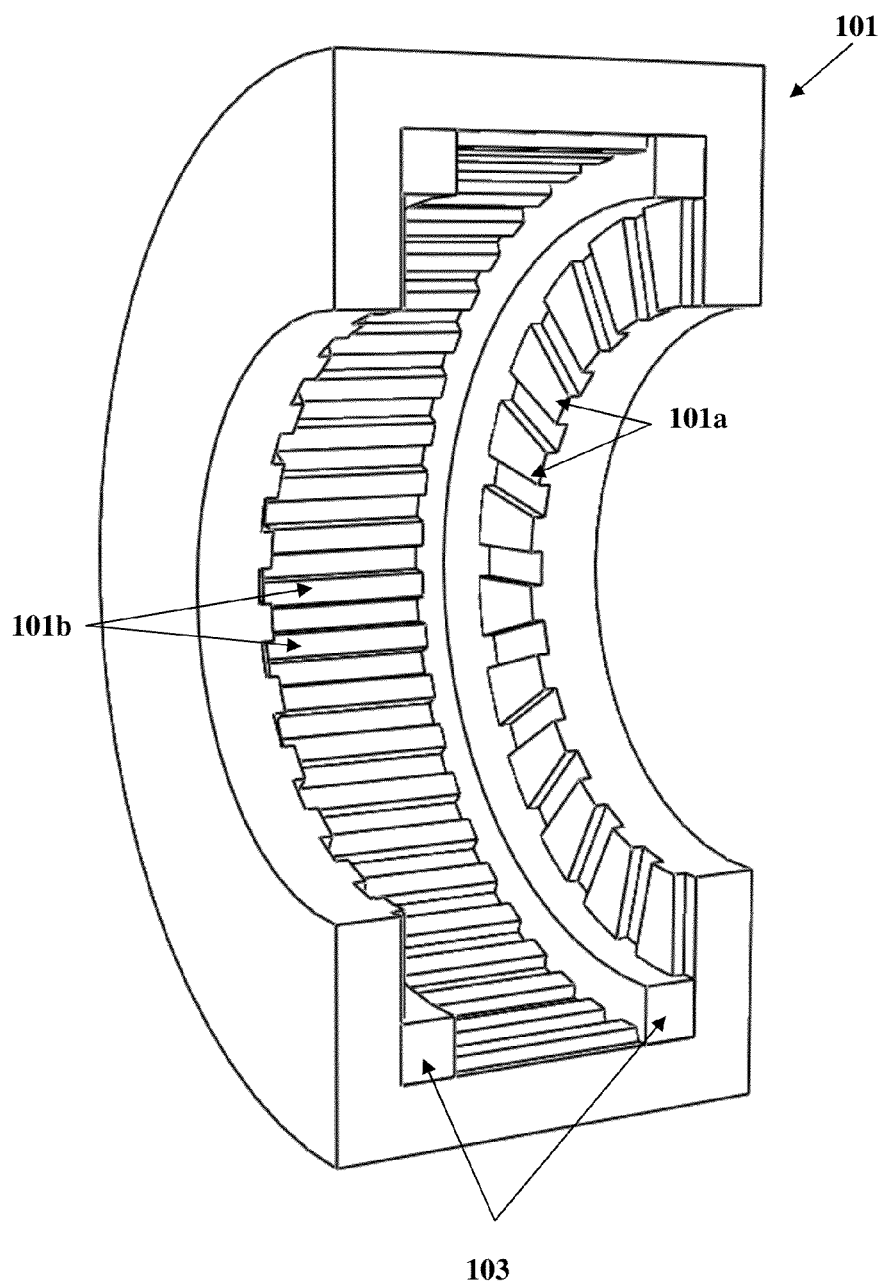
FIG. 13 exemplarily illustrates a cutaway perspective view of an embodiment of the field member of the electrical slip coupling assembly.

FIG. 13 exemplarily illustrates a cutaway perspective view of an embodiment of the field member 101 of the electrical slip coupling assembly 100. In this embodiment, the field member 101 carrying the flux concentrating axial teeth 101a and the flux concentrating radial teeth 101b is concentrically disposed outside the armature member 102 exemplarily illustrated in FIG. 4, with the flux concentrating axial teeth 101a and the flux concentrating radial teeth 101b facing inward toward the armature member 102. In this embodiment, the armature member 102 is the driving member and the field member 101 is the driven member. Changing the position and orientation of the flux concentrating axial teeth 101a and the flux concentrating radial teeth 101b, that is, having the flux concentrating axial teeth 101a and the flux concentrating radial teeth 101b facing inward toward the armature member 102 rather than outward provides equivalent performance but allows for different packaging and design options, particularly during routing of source wires for the annular windings 103. In another embodiment, the flux concentrating axial teeth 101a and the flux concentrating radial teeth 101b may be configured on the armature member 102 instead of the field member 101.

Consider an example where an electrical slip coupling assembly 100 as disclosed in the detailed description of FIGS. 1A-4, is used for transmitting torque between rotating members, for example, 101 and 102. Typical fixed and configurable parameters of the electrical slip coupling assembly 100 comprise the radius of the electrical slip coupling assembly 100, the axial air gap 108, the radial air gap 109, the material properties of the non-ferrous electrically conductive material cladding 104 and the relatively low conductivity ferrous material cladding 106, the axial teeth count, the radial teeth count, number of turns per annular field windings 103, etc. In this example, the radius of the electrical slip coupling assembly 100 from the center of the field member 101 to the middle of the annular field windings 103 is about 16 inches. The non-ferrous electrically conductive material cladding 104 on the axial inner surface 102a of the armature member 102 faces the flux concentrating axial teeth 101a of the field member 101 across an axial air gap 108 of about 0.075 inches. The relatively low conductivity ferrous material cladding 106 on the radial inner surface 102b of the ferromagnetic armature member 102 faces the flux concentrating radial teeth 101b of the field member 101 across a radial air gap 109 of about 0.075 inches. The electrical conductivity of the non-ferrous electrically conductive material on the axial inner surface 102a of the armature member 102 is about $5.96 \times 10^7$ Siemens per meter (S/m). The magnetic permeability of the material on the axial inner surface 102a of the armature member 102 is about $1.256 \times 10^{-6}$ henries per meter (H/m). The electrical conductivity of the relatively low conductivity ferrous material cladding 106 on the radial inner surface 102b of the armature member 102 is about $6.99 \times 10^6$ S/m. The magnetic permeability of the material on the radial inner surface 102b of the armature member 102 is about $6.65 \times 10^{-4}$ H/m. It is to be noted that the material properties of the radial inner surface 102b and the axial inner surface 102a of the armature member 102 exemplarily disclosed herein may be interchanged without altering the output torque transfer characteristics of the electrical slip coupling assembly 100 disclosed herein. The teeth count of the flux concentrating axial teeth 101a on the field member 101 is, for example, about 30. The teeth count of the flux concentrating radial teeth 101b on the field member 101 is, for example, about 45. The number of turns per annular field windings 103 is about 300.

FIG. 14 exemplarily illustrates a table listing the torque transfer values (Newton-meters) of the electrical slip coupling assembly 100 with the above parameters for a given range of slip speeds (rpm) and field excitations (amp-turns) of the annular field windings 103.

Figure 15:
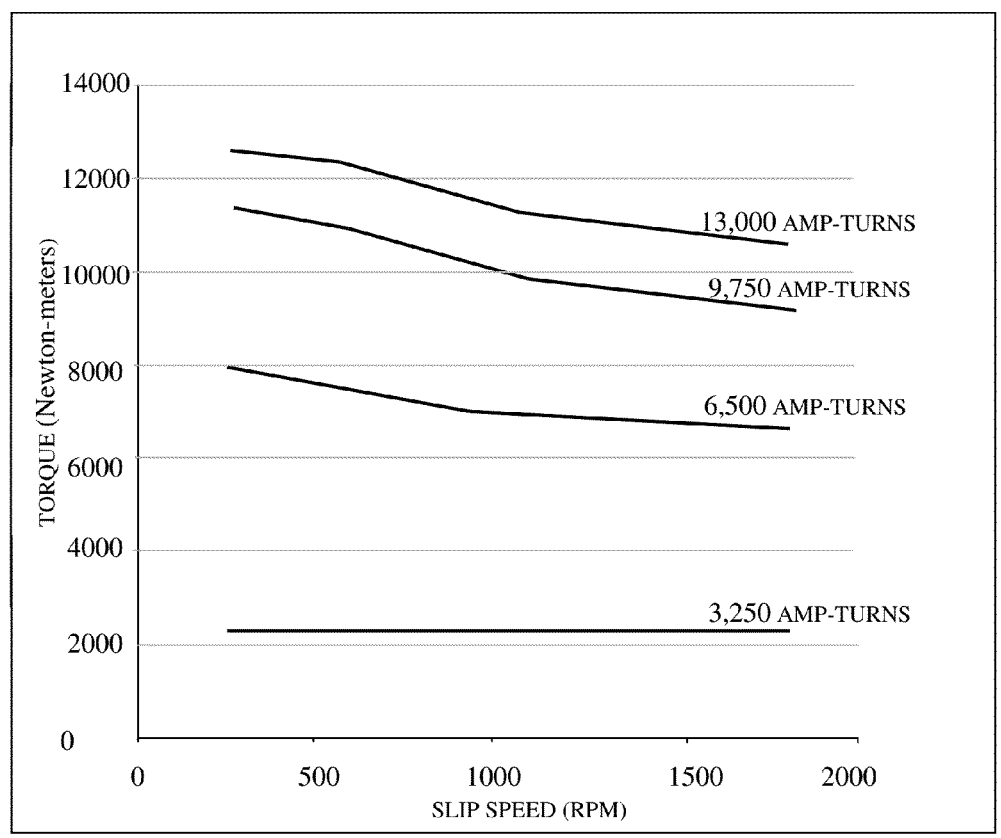
FIG. 15 exemplarily illustrates a graph showing variations of torque with respect to a range of slip speeds for different field excitations tabulated in FIG. 14.

FIG. 15 exemplarily illustrates a graph showing variations of torque with respect to a range of slip speeds for different field excitations tabulated in FIG. 14. As exemplarily illustrated in FIGS. 14-15, the torque transfer values remain uniform across the range of slip speeds for a given field excitation, owing to the disparate material characteristics on the axial inner surface 102a and the radial inner surface 102b of the armature member 102 of the electrical slip coupling assembly 100 disclosed herein.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. An electrical slip coupling assembly for enhancing variable transmission of torque between rotating members, comprising:

a field member comprising a disparate number of flux concentrating axial teeth protruding axially from a body of said field member, and flux concentrating radial teeth protruding radially from said body of said field member;

an armature member concentrically disposed in relation to said field member, said armature member defining an axial air gap between an axial inner surface of said armature member and said flux concentrating axial teeth of said field member, and a radial air gap between a radial inner surface of said armature member and said flux concentrating radial teeth of said field member;

an interchangeable non-ferrous electrically conductive material cladding disposed on said axial inner surface of said armature member, facing said flux concentrating axial teeth of said field member;

a relatively low conductivity ferrous material cladding disposed on said radial inner surface of said armature member, facing said flux concentrating radial teeth of said field member; and one or more annular windings disposed around said field member, wherein excitation of said one or more annular windings induces said flux concentrating axial teeth and said flux concentrating radial teeth of said field member to generate flux field concentrations across said axial air gap and said radial air gap respectively, and wherein said flux field concentrations create an axial eddy current zone in said armature member facing said flux concentrating axial teeth across said axial air gap, and a radial eddy current zone in said armature member facing said flux concentrating radial teeth across said radial air gap, and wherein eddy currents in said axial eddy current zone and said radial eddy current zone of said armature member, generated by relative motion between said field member and said armature member and said excitation of said one or more annular windings, create a driving torque between said field member and said armature member;

whereby said non-ferrous electrically conductive material cladding in said axial eddy current zone and said relatively low conductivity ferrous material cladding in said radial eddy current zone enable said enhanced variable transmission of said driving torque between said field member and said armature member over a range of slip speeds.

2. The electrical slip coupling assembly of claim 1, wherein said field member is one of a driving member and a driven member, and wherein said armature member is another of said driving member and said driven member.

3. The electrical slip coupling assembly of claim 1, wherein said non-ferrous electrically conductive material cladding on said axial inner surface of said armature member facing said flux concentrating axial teeth of said field member is configured to enhance generation of said eddy currents in said axial eddy current zone and to provide a stable torque developing performance at low slip speeds for a given field excitation in said one or more annular windings.

4. The electrical slip coupling assembly of claim 1, wherein said relatively low conductivity ferrous material cladding on said radial inner surface of said armature member facing said flux concentrating radial teeth of said field member is configured to enhance generation of said eddy currents in said radial eddy current zone and to provide a stable torque developing performance at high slip speeds for a given field excitation in said one or more annular windings.

5. The electrical slip coupling assembly of claim 1, wherein said non-ferrous electrically conductive material cladding on said axial inner surface of said armature member and said relatively low conductivity ferrous material cladding on said radial inner surface of said armature member comprise materials with different electrical properties and/or magnetic properties to achieve an optimal torque transmission profile over said range of said slip speeds.

6. The electrical slip coupling assembly of claim 1, wherein said non-ferrous electrically conductive material cladding on said axial inner surface of said armature member is composed of an electrically conductive non-magnetic material with a relative permeability of about unity, wherein said electrically conductive non-magnetic material comprises one of copper and aluminum.

7. The electrical slip coupling assembly of claim 1, wherein said relatively low conductivity ferrous material cladding on said radial inner surface of said armature member is composed of a magnetic material, wherein said magnetic material comprises one of iron and steel.

8. The electrical slip coupling assembly of claim 1, wherein said one or more annular windings comprise one of a round cross section and a rectangular cross section having a predefined gauge and a predefined number of turns.

9. The electrical slip coupling assembly of claim 1, wherein said one or more annular windings are disposed in a plurality of predefined positional configurations around said field member.

10. The electrical slip coupling assembly of claim 1, wherein one or more dimensional parameters of said one or more annular windings are varied for producing optimal torque transmission characteristics.

11. The electrical slip coupling assembly of claim 1, wherein one or more of dimensional parameters and number of said flux concentrating axial teeth and said flux concentrating radial teeth are varied for producing optimal torque transmission characteristics.

12. A method for enhancing variable transmission of torque between rotating members, comprising:
providing an electrical slip coupling assembly comprising:
a field member comprising a disparate number of flux concentrating axial teeth protruding axially from a body of said field member, and flux concentrating radial teeth protruding radially from said body of said field member;
an armature member concentrically disposed in relation to said field member, said armature member defining an axial air gap between an axial inner surface of said armature member and said flux concentrating axial teeth of said field member, and a radial air gap between a radial inner surface of said armature member and said flux concentrating radial teeth of said field member;
an interchangeable non-ferrous electrically conductive material cladding disposed on said axial inner surface of said armature member, facing said flux concentrating axial teeth of said field member;
a relatively low conductivity ferrous material cladding disposed on said radial inner surface of said armature member, facing said flux concentrating radial teeth of said field member; and
one or more annular windings disposed around said field member;
generating flux field concentrations by said flux concentrating axial teeth and said flux concentrating radial teeth of said field member across said axial air gap and said radial air gap respectively, on excitation of said one or more annular windings, wherein said flux field concentrations create an axial eddy current zone in said armature member facing said flux concentrating axial teeth across said axial air gap, and a radial eddy current zone in said armature member facing said flux concentrating radial teeth across said radial air gap; and
creating a driving torque between said field member and said armature member by eddy currents generated in said axial eddy current zone and said radial eddy current zone of said armature member by relative motion between said field member and said armature member and said excitation of said one or more annular windings;
whereby said non-ferrous electrically conductive material cladding in said axial eddy current zone and said relatively low conductivity ferrous material cladding in said radial eddy current zone enable said enhanced variable transmission of said driving torque between said field member and said armature member over a range of slip speeds.

13. The method of claim 12, wherein said field member is one of a driving member and a driven member, and wherein said armature member is another of said driving member and said driven member.

14. The method of claim 12, further comprising enhancing generation of said eddy currents in said axial eddy current zone and providing a stable torque developing performance at low slip speeds for a given field excitation in said one or more annular windings, by said non-ferrous electrically conductive material cladding on said axial inner surface of said armature member facing said flux concentrating axial teeth of said field member.

15. The method of claim 12, further comprising enhancing generation of said eddy currents in said radial eddy current zone and providing a stable torque developing performance at high slip speeds for a given field excitation in said one or more annular windings, by said relatively low conductivity ferrous material cladding on said radial inner surface of said armature member facing said flux concentrating radial teeth of said field member.

16. The method of claim 12, further comprising selecting materials with different electrical properties and/or magnetic properties for said non-ferrous electrically conductive material cladding on said axial inner surface of said armature member and said relatively low conductivity ferrous material cladding on said radial inner surface of said armature member to achieve an optimal torque transmission profile over said range of said slip speeds.

17. The method of claim 12, wherein said non-ferrous electrically conductive material cladding on said axial inner surface of said armature member is composed of an electrically conductive non-magnetic material with a relative permeability of about unity, wherein said electrically conductive non-magnetic material comprises one of copper and aluminum.

18. The method of claim 12, wherein said relatively low conductivity ferrous material cladding on said radial inner surface of said armature member is composed of a magnetic material, wherein said magnetic material comprises one of iron and steel.

19. The method of claim 12, wherein said one or more annular windings comprise one of a round cross section and a rectangular cross section having a predefined gauge and a predefined number of turns.

20. The method of claim 12, further comprising disposing said one or more annular windings in a plurality of predefined positional configurations around said field member.

21. The method of claim 12, further comprising varying one or more dimensional parameters of said one or more annular windings for producing optimal torque transmission characteristics.

22. The method of claim 12, further comprising varying one or more of dimensional parameters and number of said flux concentrating axial teeth and said flux concentrating radial teeth for producing optimal torque transmission characteristics.

* * * * *